(No Model.)
B. F. BERGH.
HAND TRUCK.
No. 334,505. Patented Jan. 19, 1886.
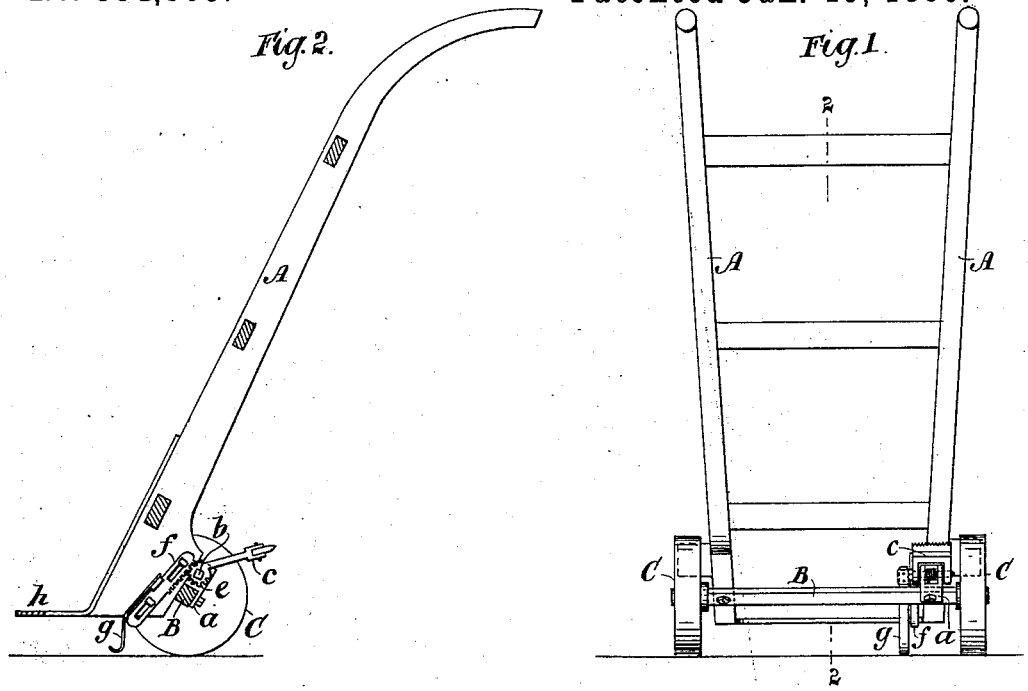
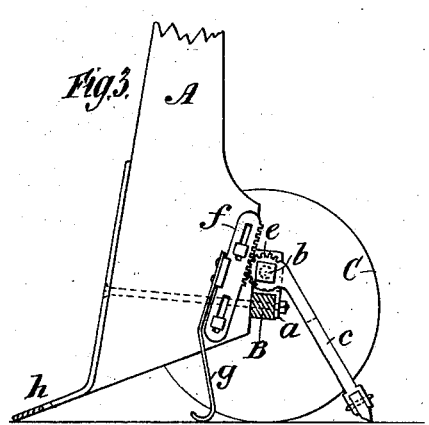
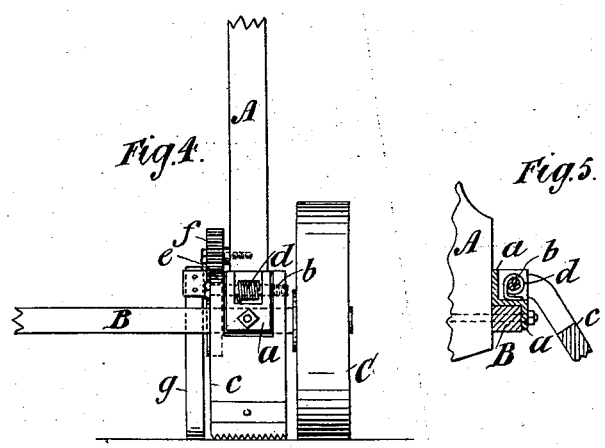
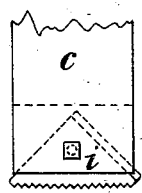
Witnesses
Daniel Driscoll
Edward T. Roche
Inventor
Bror F. Bergh
by Gifford & Brown
Attys.

UNITED STATES PATENT OFFICE.

BROR F. BERGH, OF NEW YORK, N. Y.

HAND-TRUCK.

SPECIFICATION forming part of Letters Patent No. 334,505, dated January 19, 1886.

Application filed July 16, 1885. Serial No. 171,732. (No model.)

*To all whom it may concern:*

Be it known that I, BROR F. BERGH, a citizen of the United States, residing in the city of New York, in the county and State of New York, have invented an Improvement in Hand-Trucks, of which the following is a specification.

The object of my improvement is to provide means by which the backward movement of the hand-truck is prevented when a body is being lifted upon it in the ordinary manner. There are also attendant advantages in the construction which I have adopted which may or may not be employed.

In the drawings I have shown a form of mechanism which I prefer for carrrying out my invention, though I do not limit myself to the form of mechanism here shown.

Figure 1 represents a rear view of a hand-truck when in the position shown in Fig. 2. Fig. 2 shows a longitudinal section through the line 2 2 of Fig. 1. In both Figs. 1 and 2 the dogging-lever is raised in the position which it occupies when the hand-truck is in motion. Fig. 3 represents the same thing as Fig. 2, excepting that the parts are here enlarged and the dogging-lever is in the position which it occupies when the body is being lifted onto the truck. Figs. 4 and 5 represent details of construction. Fig. 6 represents a modification relating to the edge of the dogging-lever.

A is the frame of the truck, terminating at the rear ends in the ordinary handles.

B is the ordinary axle of a truck; C, the ordinary wheels.

According to the common construction the axle is secured to the frame by a bolt passing through the axle and entering the frame on either side.

$a$ is a shackle or coupling, which may be secured, as shown in the drawings, by the same bolt which secures the axle in place, or by any other suitable arrangement. Through this shackle or coupling passes a horizontal pin, $b$, upon which is pivoted a lever, $c$. One arm of this lever is provided with an edge, which is suitable for engaging with and taking firm hold upon any ordinary surface with which it is brought in contact. I prefer a serrated edge, or a rubber edge, or a knife-edge. The length of this lever $c$ is such that when the truck is in the position indicated in Fig. 3 the knife-edge of the lever will come in contact with the floor or ground when the lever is inclined about as shown in that figure.

Upon the pin $b$, which pivots the lever $c$, is mounted a spiral spring, $d$, the tendency of which is always to keep the lever $c$ in the raised position indicated in Figs. 1 and 2. On the opposite side of the dogging-lever from that on which the arm $c$ projects are provided pinion-teeth $e$, which engage with rack-teeth mounted on a slide, $f$, which is secured to the side of the frame by a sliding connection, as shown. When the slide $f$ is free to move, the pressure of the spring $d$ raises the lever $c$ and moves the slide forward; but when the slide $f$ is pushed backward the lever $c$ is moved downward into the position shown in Fig. 3, against the tension of the spring $d$.

$g$ is a spring-piece projecting forward from the slide, and preferably of the form shown.

$h$ is a metallic projection on the front of the hand-truck, which is inserted under any body which is to be placed on the truck.

The operation is as follows: When the truck is in the position shown in Fig. 2, the piece $g$ is not in contact with the floor, and the slide $f$ is in its forward position, and consequently the lever $c$ is in its raised position. When it is desired to load the hand-truck, the handles are raised until the piece $h$ touches the floor or ground, so as to be in position to be inserted under the body to be raised. In this position the piece $g$ also touches the floor, and by reason of its contact with the floor forces the slide $f$ into its backward position, as shown in Fig. 3. As this is done, however, the action of the rack and pinion teeth causes the lever $c$ to swing downward against the tension of the spring $d$ until the edge at its outer end is brought in contact with the floor or ground. When in this position, this lever $c$ acts as a dog to prevent any backward movement of the axle of the truck whatsoever; also, as the handles are brought downward the first effect of this dog is to cause the axle to be advanced, because it will be observed that the pivot of the dog is located between the axle and the handles. This is only momentary, however, since as soon as the handles have been brought down sufficiently to clear the piece *g* from the floor the action of the spring *d*, being unopposed, raises the lever *c*. The dogging action of the lever *c* is, however, continued long enough to prevent any backward movement of the truck as the body is being loaded upon it, and will remain engaged with the ground or floor as long as there is any backward strain exerted upon it. The piece *g* is preferably made of a spring in about the form shown. One advantage of having it thus constructed is that it may yield to unevennesses in the ground if brought suddenly in contact with the ground or any obstacle, and thus uniformity of action is secured and breaking is prevented. Thus the piece *h* may always be brought down to the point required, and the piece *g* will, if necessary, yield sufficiently for that purpose.

It will be observed that the attachment which I have described is adapted to be applied to any ordinary hand-truck without the necessity of having the construction of the truck changed for that purpose. The attachment is furthermore simple, not likely to get out of order, and cheap. When the truck is in motion, the attachment is entirely thrown out of connection with any operative part of the truck, and the truck may be used freely, as though the attachment were not present.

In Fig. 6 I have shown a modification of the extremity of the lever *c*, by which provision is made for the use of three kinds of edges—either a knife-edge, a rubber edge, or a serrated edge. This is accomplished by attaching to the extremity of the lever *c* a triangular-shaped piece, *i*, which is pivoted by a set-screw attachment to the lever, so that either side of the triangle may be presented to the floor. Each side of the triangle presents a different kind of edge from the other, and thus the person using the truck by bringing one or the other of the edges into position may vary the form of edge to suit the floor or ground with which it is to be brought in contact; or the three edges of the triangle might be made the same, so that when one edge becomes worn out another can be brought into position.

I have described and shown a form of mechanism which is well adapted for carrying out my invention; but I am aware that the form and arrangement of these parts may be considerably varied and still embody the principle of my invention, and therefore do not limit myself to the precise form and arrangement shown; nor do I limit myself to the accomplishment of all of the results which are due to the form and arrangement shown.

As examples of arrangements shown which are useful, but not essential, I may mention the attachment of the coupling *a* by means of the bolt which secures the axle in place; also the position of the pin *b* between the axle and the handles, by which the dogging-lever acts to a certain extent as a starter as well as a stop, and the location of the spring *d*; also the particular position in which the slide *f* is placed, and the consequent location of the piece *g*; also the rack-and-pinion connection between the pieces *c* and *g*, other mechanical means of connection—such as a link—being possible. In all of these details and many others the mechanism might be varied, though, I believe, with less beneficial results.

What I claim as my invention, and desire to secure by Letters Patent, is—

1. In combination with the frame of a hand-truck, the axle mounted on the frame, the handles whereby the forward end of the frame is tilted upward on the axle, and the dogging-lever pivoted to the truck intermediate the handles and the axle, whereby when the dogging-lever is in contact with the ground the wheels will be advanced by the downward movement of the handles, substantially as described.

2. In combination with a hand-truck, the dogging-lever pivoted to the truck, the spring whereby the dogging-lever is raised, and a piece connected with the lever on the opposite side of its pivot from the dog and projecting forward of the axle, substantially as described, whereby when the truck is thrown forward for the purpose of loading the dogging-lever is thrown downward, as set forth.

3. In combination with the axle of a hand-truck, two arms connected together and projecting one forward and the other backward of the axle, the arm projecting to the rear of the axle being pivoted to the hand-truck and connected with the arm projecting on the forward side of the axle, substantially as described, whereby pressure brought to bear against the arm projecting on the forward side of the axle causes the arm projecting to the rear of the axle to fall in contact with the floor or ground, as set forth.

4. In combination with a hand-truck, the swinging dog projecting to the rear of the axle, a movable piece connecting with the swinging dog and moving therewith, and provided with a spring-extension adapted to come in contact with the floor forward of the wheels, substantially as described.

5. In combination with a hand-truck, the forward-projecting piece *h*, the forward-projecting piece *g*, and the backward-projecting piece *c*, all adapted to be in contact with the floor at the same time, and the backward-projecting piece *c* being connected with the forward-projecting piece *g*, substantially as described, whereby the upward motion of the latter, caused by its contact with the floor, produces the downward motion of the former into contact with the floor, substantially as described.

BROR F. BERGH.

Witnesses:
DANIEL H. DRISCOLL,
EDWARD T. ROCHE.